Aug. 13, 1929.  C. M. VAN AUKEN  1,724,535
VEHICLE SEAT
Filed Sept. 10, 1926   3 Sheets-Sheet 1
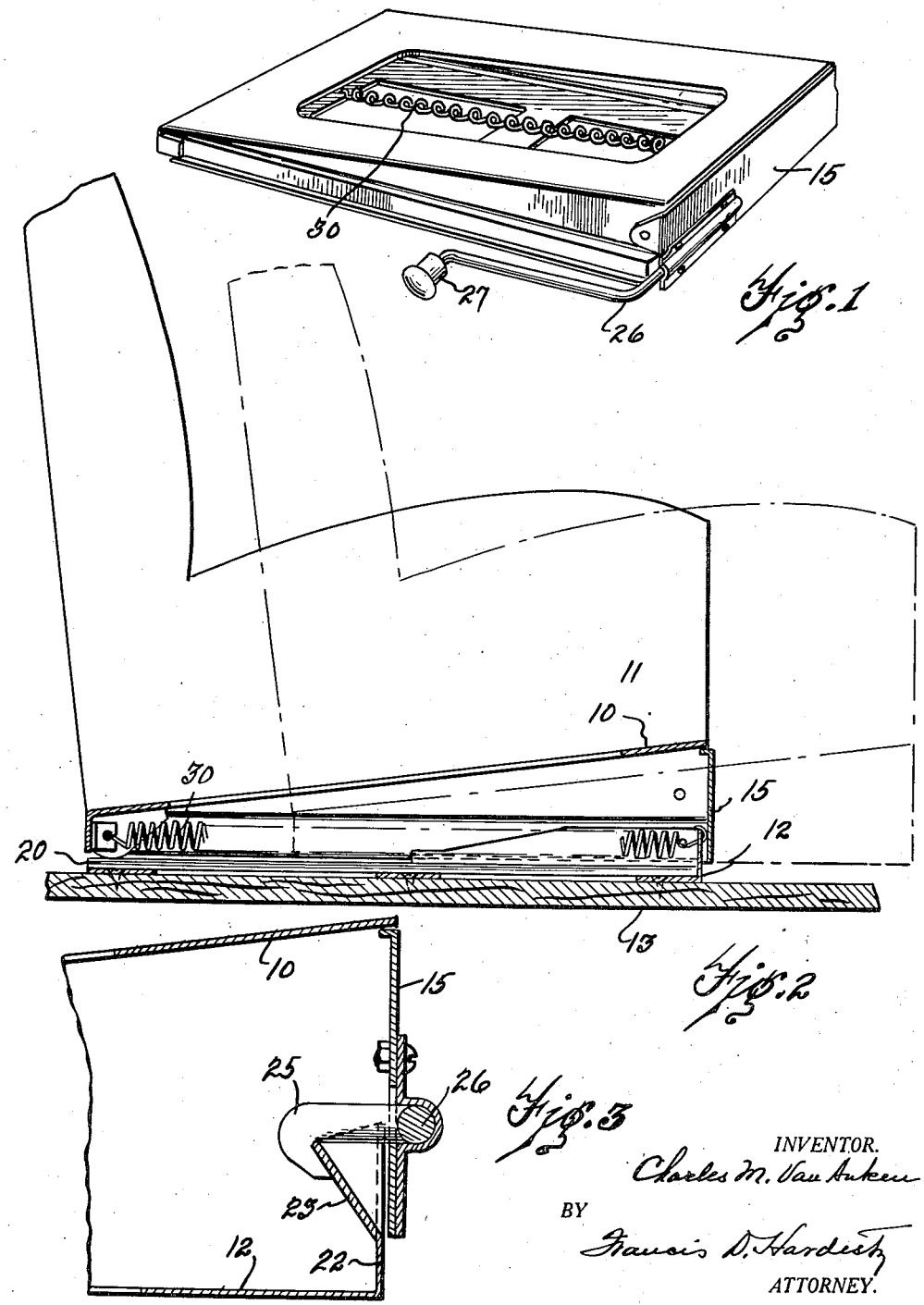

Aug. 13, 1929.  C. M. VAN AUKEN  1,724,535
VEHICLE SEAT
Filed Sept. 10, 1926   3 Sheets-Sheet 2
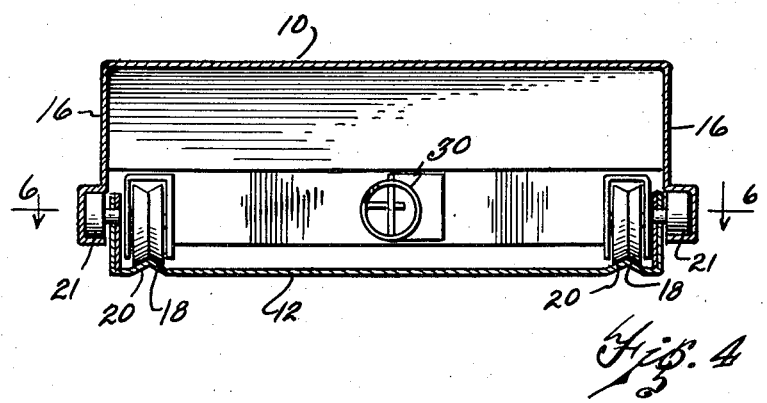
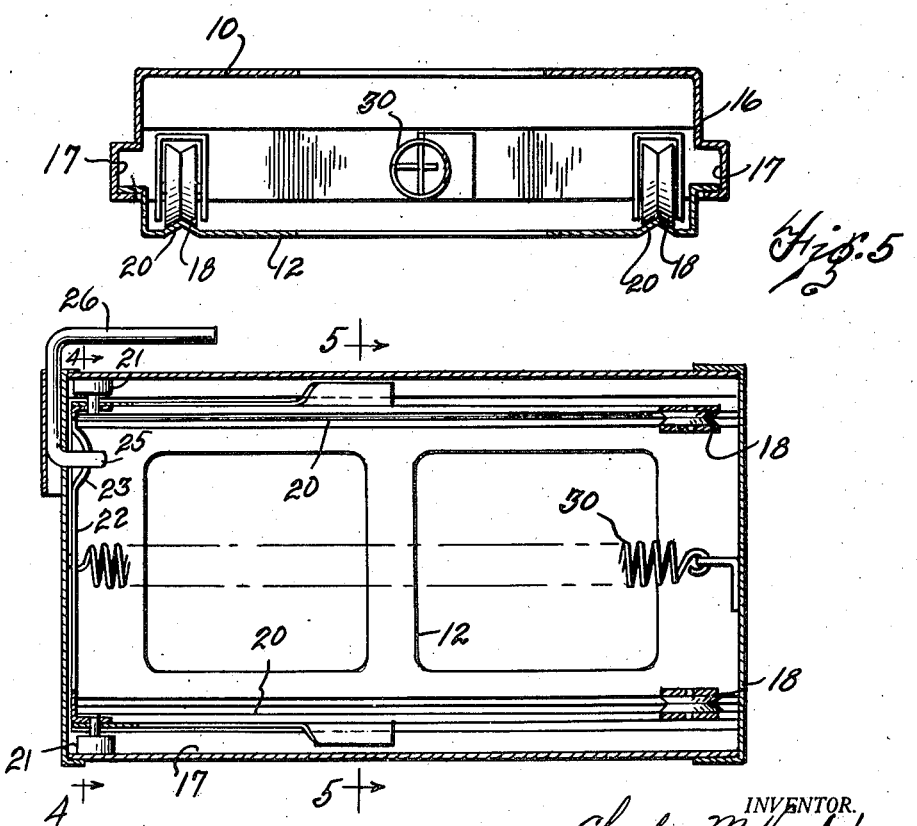

Aug. 13, 1929.  C. M. VAN AUKEN  1,724,535
VEHICLE SEAT
Filed Sept. 10, 1926  3 Sheets-Sheet 3
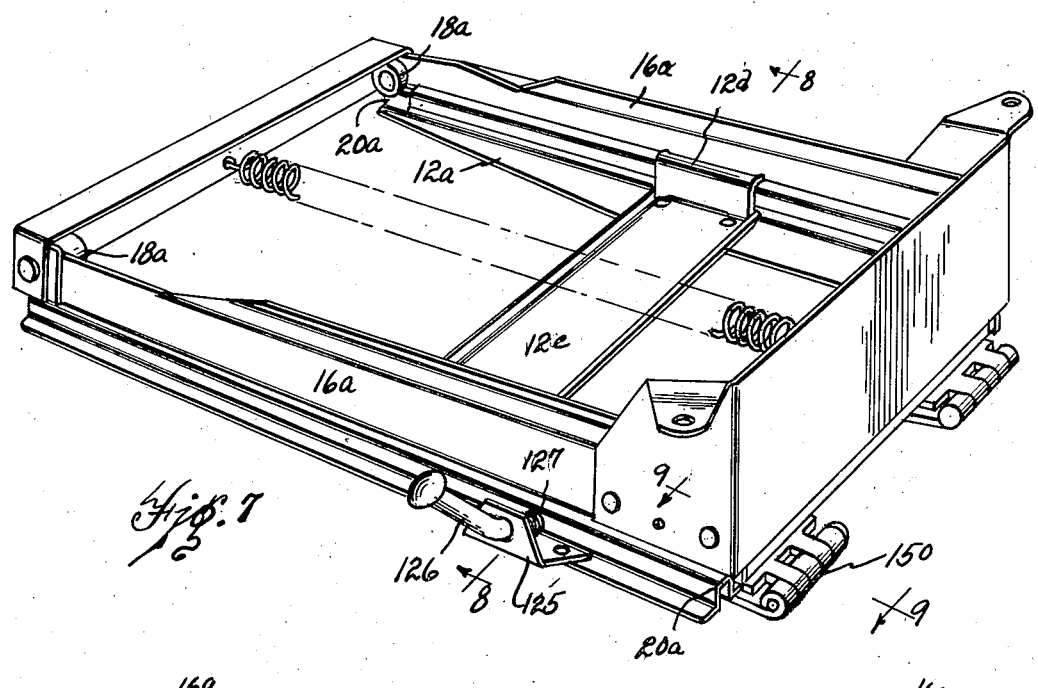
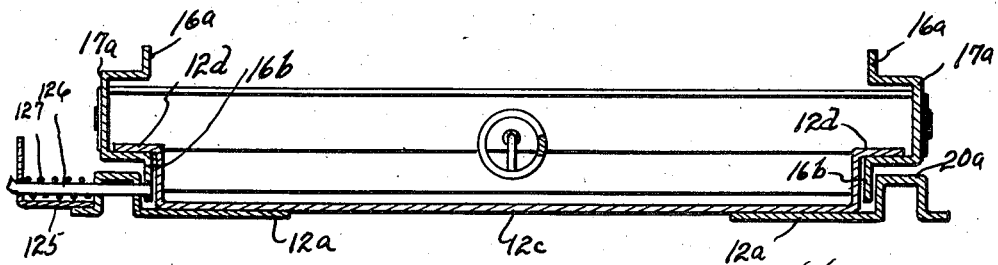
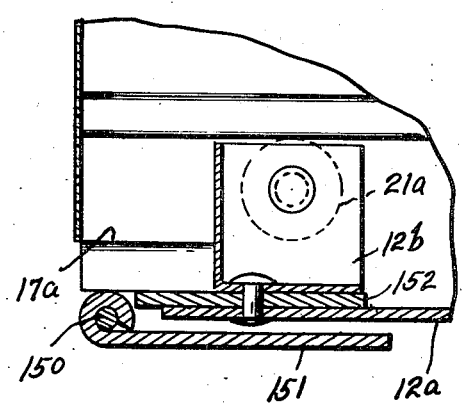
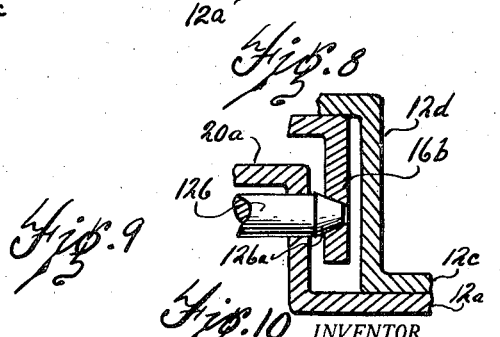
INVENTOR.
Charles M. Van Auken
BY
Francis D. Hardesty
ATTORNEY.

Patented Aug. 13, 1929.

1,724,535

UNITED STATES PATENT OFFICE.

CHARLES M. VAN AUKEN, OF PONTIAC, MICHIGAN, ASSIGNOR, BY MESNE ASSIGNMENTS, TO MECHANICAL DEVICES CORPORATION OF AMERICA, OF BUFFALO, NEW YORK, A CORPORATION OF NEW YORK.

VEHICLE SEAT.

Application filed September 10, 1926. Serial No. 134,737.

The present invention relates to seats, particularly for vehicles such as automobiles.

Among the objects of the invention is a seat, more especially suitable for the well known "coach" or two-door sedan type of automobile body, which seat is movable to permit passage of persons entering or leaving the rear seats.

Another object is a seat of the type mentioned which shall be movable sufficiently to allow the easy passage to and from the rear seats and yet not seriously inconvenience the occupant of the movable seat.

Still another object is a seat of the type mentioned which shall be operable with a minimum of effort by the occupant, the movement of said seat being accomplished by release of energy stored in an energy storing element.

With these and other objects in view as will readily appear to those skilled in the art from the following description, the invention consists broadly in a seat mounted upon a support secured thereto and to the floor of the vehicle constructed and arranged to permit moving the seat forward a short distance with the seat in upright position, and in means to cause such movement without effort of the occupant, the seat being normally retained in its rearward position.

Reference should be made to the accompanying drawings, in which:

Fig. 1 is a perspective view of the seat support;

Fig. 2 is a longitudinal section therethrough;

Fig. 3 is an enlarged sectional detail of the front plate;

Fig. 4 is a section on line 4—4 of Fig. 6;

Fig. 5 is a section on line 5—5 of Fig. 6;

Fig. 6 is a section on line 6—6 of Fig. 4;

Fig. 7 is a perspective view of a modified form of the device;

Fig. 8 is a section taken on line 8—8 of Fig. 7;

Fig. 9 is a section on line 9—9 of Fig. 7;

Fig. 10 is a sectional detail view of a part of Fig. 8.

As indicated in the drawings, the preferred form of embodiment of the invention consists of a two-part platform of which one part 10 is secured to the baseboard of a seat 11 and the other part 12 is secured to the floor board 13 of the vehicle body.

Of the two parts 10 and 12, the former is preferably triangular in longitudinal section as shown in Fig. 2 with its higher or front end closed by a removable plate 15 and having integral side walls 16. Near the lower edges of walls 16 are provided channels 17 extending from the front to about midway of the length of the walls. Also, this part 10 is provided with two peripherally grooved rollers 18 at the rear end.

The part 12, forming the lower portion of the device consists of a shallow tray-like member having longitudinal ribs 20 serving as tracks for rollers 18 and carries at its forward end two small rollers 21 operating in channels 17.

At the forward end of part 12 the upturned flange 22 has a portion 23 bent inwardly to serve as a catch for a hook 25 formed on the inner end of a rod 26 carried by plate 15, which rod extends to the side of the device and is provided with a handle 27 by means of which hook 25 may be lifted from the catch 23. Further, a comparatively strong tension spring 30 is secured at one end to the flange 22 on part 12 and at its other end to rear end of part 10, so that when the hook 25 is lifted, the spring draws the seat forward on the rollers 18 and 21 with little or no effort on the part of an occupant. To return the seat to normal position, the occupant merely pushes it back until the hook 25 drops over the catch 23.

In the form of the invention shown in Figs. 7, 8 and 9 a somewhat different form of construction and a further feature of the invention is shown.

In these figures, the track or base portion is shown as being made of two parts 12ª each ribbed to form a track rail 20ª for rollers 18ª and these two parts are connected at the front end by cross member 12ᵇ and about midway of their length by a cross member 12ᶜ.

The upper movable portion of the support is also shown as made of several portions riveted together, the side members 16ᵃ being formed with a longitudinal channel 17ᵃ in which operate the rollers 21ᵃ mounted on cross member 12ᵇ. The members 16ᵃ also are provided with a depending edge portion 16ᵇ which extends along the inner side of track 20ᵃ and aids in preventing lateral displacement of the parts. Further, the cross member 12ᶜ is provided with upwardly and outwardly projecting ends 12ᵈ which extend into channel 17ᵃ and close to the bottom thereof. This member therefore serves also as a lateral guide and in addition acts to hold the upper supporting part down upon the lower part.

In this form of the invention instead of the hook 25 a different locking means is provided. In this form a bracket 125 is fixed upon the outer edge of one member 12ᵃ and aligned holes provided in the bracket and the two sides of the track 20ᵃ. Through these holes is a pin 126 spring pressed inwardly by spring 127. The inner end of the pin passes into a suitable hole in the depending edge 16ᵇ of the adjacent member 16ᵃ as shown clearly in Fig. 8. If only one locked position of the seat is desired, only one hole in 16ᵇ need be provided. If, however, it is desired to provide forward and backward adjustment for the seat, as for a driver's seat, a number of holes may be provided in 16ᵇ to give the required number of locked positions. Fig. 10 is a portion of Fig. 8 enlarged to show the tapering end 126ᵃ of pin 126 by means of which any wear on either hole or pin is automatically taken up.

A further feature of this form of seat is that the track portion of the support is provided with hinges 150 at its forward end, one leaf 151 of the hinges being fastened to the body floor and the other 152 to the members 12ᵃ. By using the hinges, the whole seat and support may be tilted forward in the manner of the present seats when not occupied and, when occupied, they act to anchor the track portion to the floor so that the seat may be moved forward as described.

This application is in part a continuation of application Ser. No. 69,728, filed Nov. 18, 1925 on vehicle seats.

It is, of course, obvious that many minor changes may be made in the construction without departing from the principles of the invention and such changes are contemplated, but it is to be understood that all such changes may be made and the construction still be within the scope of the claims which follow.

I claim:—

1. As an article of manufacture, a seat supporting unit adapted to be attached to a supporting surface and to the underside of a seat, said unit comprising two relatively movable portions normally latched in superposed relation, a spring connecting opposite ends of said portions and under tension during said superposition, and guide means carried by one of said portions to maintain alinement of said portions when unlatched, and during the relative movement thereupon produced by said spring.

2. As an article of manufacture, a seat supporting unit adapted to be attached to a supporting surface and to the underside of a seat, said unit comprising two relatively movable portions normally latched in superposed relation, a spring connecting opposite ends of said portions and under tension during said superposition, each of said portions having rollers at one end and each having tracks to cooperate with the rollers carried by the other, one of said portions having side walls with longitudinally extending ribs of rectangular section, the interiors of which ribs form the tracks for and guiding means for the rollers carried by the other portion, and additional guide means carried by the said other portion.

3. Seat supporting means comprising relatively movable platforms, one of which is fixed to a base and the other to the seat, upstanding guide rails disposed lengthwise at opposite sides of the fixed platform, antifriction members carried by the movable platform and engaging said guide rails, an energy-storing element connected to said platforms and tending to urge the movable platform in a forward direction relative to the fixed platform, and means for latching the movable platform to the fixed platform, said last-named means when unlatched allowing said energy-storing element to automatically move the seat bearing platform in a forward direction.

4. Seat supporting means comprising relatively movable platforms, one of which is fixed to a base and the other to the seat, longitudinal track rails disposed in spaced parallel relation on said fixed platform, the seat-bearing platform slidingly engaging the track rails and having longitudinal channel ways therein disposed above and in substantially vertical alinement with said rails, the lower wall of each channel way overlying the tread surface of its rail and terminating at one edge in a depending flange overlying the side portion of the rail, guide rollers applied to the fixed platform and seat-bearing platform and engaging, respectively, the channel ways of the latter and the track rails of the former, and means for latching the seat-bearing platform in a given position relative to the fixed platform.

5. Seat supporting means comprising relatively movable platforms, one of which is fixed to a base and the other to the seat, longitudinal track rails disposed in spaced parallel relation on said fixed platform, the seat-bearing platform slidingly engaging the track rails and having longitudinal channel ways therein disposed above the tread surface of said rails, guide rollers applied to one end of the fixed platform and to the opposite end of the seat-bearing platform, the rollers of said fixed platform engaging the channel ways in said seat-bearing platform and the rollers of the latter engaging the track rails of the fixed platform, means for latching the movable platform to the fixed platform, and a spring connecting said platform and arranged to automatically propel the movable platform over the fixed platform when said latching means is unlatched.

CHARLES M. VAN AUKEN.